United States Patent [19]

Womack et al.

[11] Patent Number: 5,781,680

[45] Date of Patent: Jul. 14, 1998

[54] SEALED OPTICAL FIBER CONNECTOR ADAPTER

[75] Inventors: Michele René Womack, Carrollton; Michael de Jong, Fort Worth; David T. Underwood, N. Richland Hills, all of Tex.

[73] Assignee: Siecor Corporation, Hickory, N.C.

[21] Appl. No.: 670,374

[22] Filed: Jun. 25, 1996

[51] Int. Cl.⁶ ........................................... G02B 6/38
[52] U.S. Cl. ........................ 385/53; 385/70; 385/72
[58] Field of Search ................................ 385/53, 60, 64, 385/55, 56, 62, 63, 70, 76, 71, 72

[56] References Cited

U.S. PATENT DOCUMENTS

| | | | |
|---|---|---|---|
| 5,317,663 | 5/1994 | Beard et al. | 385/70 |
| 5,359,688 | 10/1994 | Underwood | 385/70 |
| 5,530,783 | 6/1996 | Belopolsky et al. | 385/53 |

*Primary Examiner*—Phan T. H. Palmer
*Attorney, Agent, or Firm*—Wesley T. Noah

[57] ABSTRACT

The present invention provides an adapter for sealingly receiving ferrules of standard optical fiber connectors such that the end faces of the ferrules are protected from moisture when inserted into the adapter. The adapter has a sealing sleeve that defines a sealing surface at each end to circumferentially seal about a ferrule. An alignment sleeve that is sized for operatively aligning the end faces of the ferrules is disposed coaxially inside the sealing sleeve. A retainer retains the sealing sleeve and allows for mounting of connectors thereto.

8 Claims, 3 Drawing Sheets

SEALED OPTICAL FIBER CONNECTOR ADAPTER

TECHNICAL FIELD OF INVENTION

The present invention relates to an adapter for sealingly receiving ferrules of optical fiber connectors to protect the end faces of the ferrules from moisture.

BACKGROUND OF THE INVENTION

Optical fiber connectors are increasingly being deployed in "outside plant" environments, that is, in unprotected outdoor environments. Industry standard connectors such as the SC, FC and MTP connectors have been traditionally designed for protected indoor or closure environments. It has been strongly urged by at least one research facility that optical fiber connectors in the outside plant be protected from exposure to high humidity. It has been suggested that high humidity present at the mating end faces of optical fiber connectors in the adapter may adversely effect connector loss and reflectance.

While there are hermetically sealed optical fiber connectors disclosed in the prior art, such connectors are either expensive to manufacture, have an excessive amount of components, and/or are not of industry standard configuration. Accordingly, a need exists for an optical fiber connector that protects the mating end faces from humidity while being of a simple industry standard configuration and not being prohibitively expensive or difficult to manufacture.

SUMMARY OF THE INVENTION

The present invention provides an adapter that sealingly receives the ferrules of connectors to be mated to prevent moisture from accessing the end faces of the ferrules. The adapter receives optical fiber connectors in mating relationship. The connectors have a ferrule having a first end with an end face for abutting with an end face of another connector and a second end opposite thereto defining a longitudinal axis extending from the first end to the second end. The adapter comprises two seal sleeve halves joined together to create a sealing sleeve that defines a passageway therethrough. Each seal sleeve half defines a seal surface sized to circumferentially seal around a ferrule when the ferrule is inserted into the adapter. Each seal sleeve half defining a flange with a first surface for sealingly mating with the first surface of the other flange.

An alignment sleeve is located generally co-axially within the two seal sleeve halves and longitudinally between the seal surfaces. The alignment sleeve is sized for receiving and operatively aligning the end faces of two connectors therein. The ferrule sleeve has a first end and a second end opposite thereto. The adapter further comprises a retainer for retaining the flanges of the two seal sleeve halves biased together in a face seal relationship.

The present invention provides a sealed adapter that is easy to manufacture and assemble and that can be used with industry standard connectors. The subassembly of the alignment sleeve and sealing sleeve allows the alignment sleeve to be optimally designed for aligning the end faces of the ferrules while the sealing sleeve can be optimally designed for sealing with he ferrules to prevent moisture from accessing the end faces of the ferrules.

DETAILED DESCRIPTION

Figure 1:
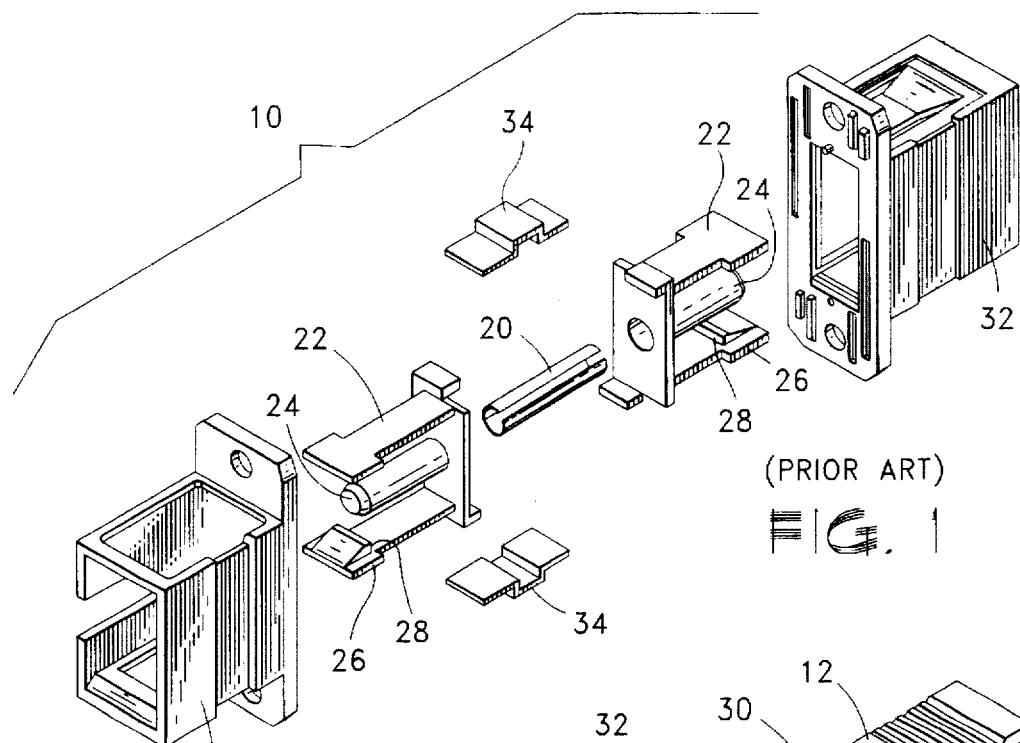
FIG. 1 is an exploded perspective view of a prior art adapter.
Figure 2:
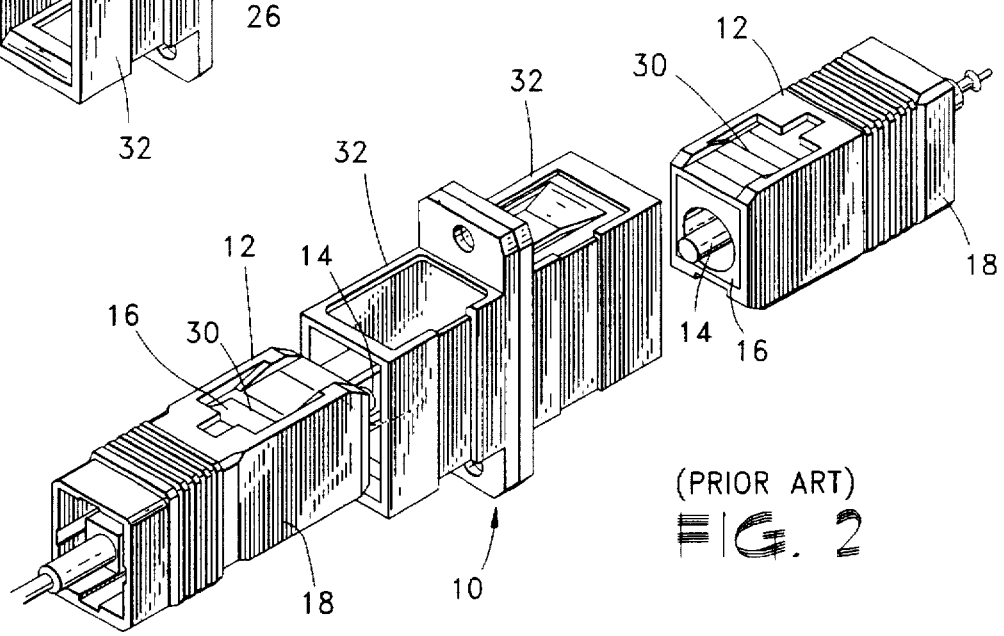
FIG. 2 is a perspective view of industry standard optical fiber connectors disposed for insertion in the adapter of FIG. 1.
Figure 3:
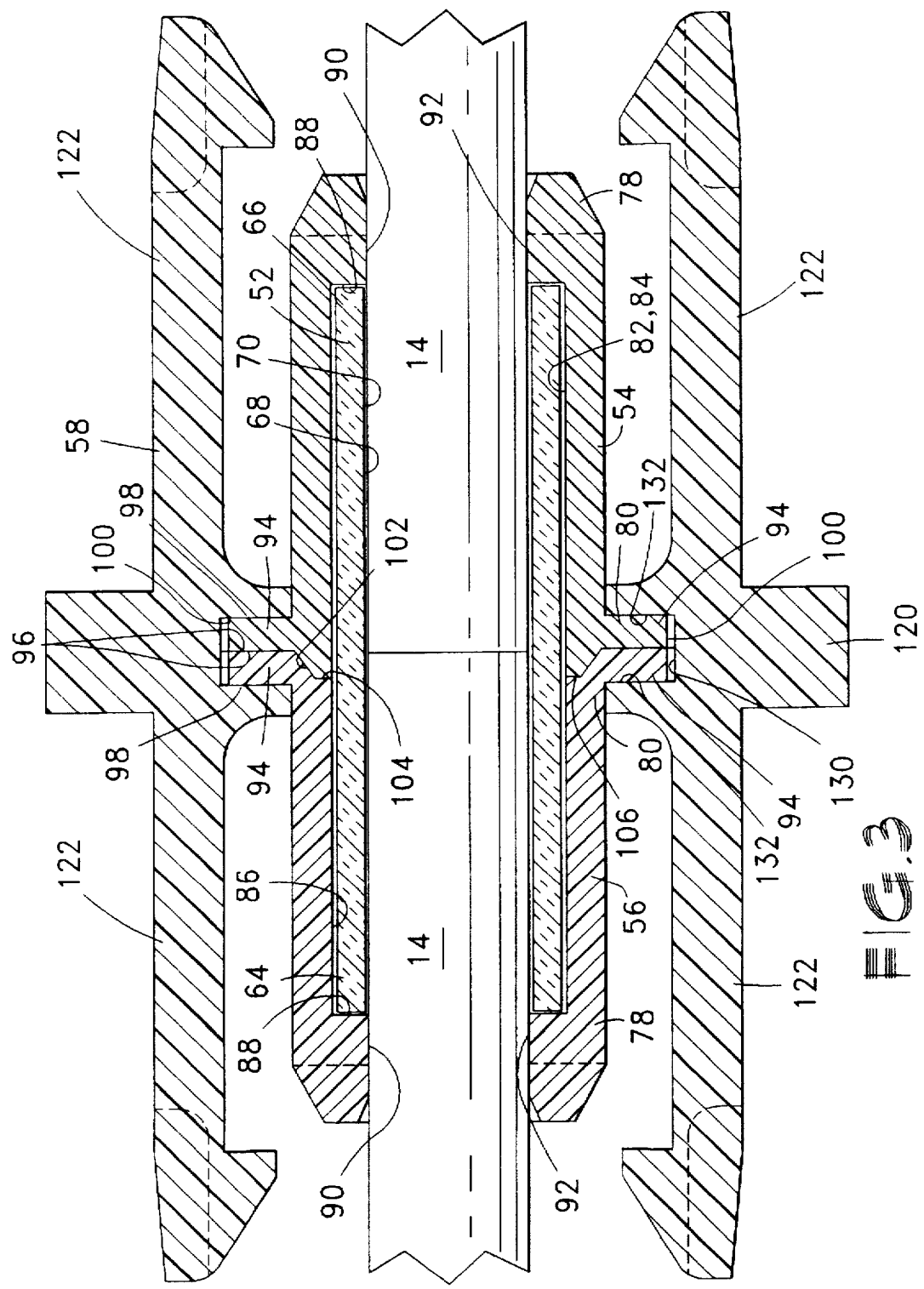
FIG. 3 is a longitudinal cross-section of the preferred embodiment of the adapter of the present invention.

With reference to FIGS. 1 and 2, a prior art optical fiber connector adapter 10 and connectors 12 are shown. Adapter 10 and connectors 12 are of the SC type. Connector 12 has ferrule 14 spring mounted in connector housing 16. Connector housing 16 is disposed in grip sleeve 18. Grip sleeve 18 slides relative to connector housing 16 and serves to disengage connector 12 from adapter 10 when pulled and facilitates engagement of connector 12 to adapter 10 when pushed.

A conventional SC adapter 10 has ceramic ferrule sleeve 20 for receiving and aligning the ends of ferrules 14 of connectors 12. Ferrule sleeve 20 is received in two inner halves 22. Each inner half 22 has retaining sleeve 24 for retaining ferrule sleeve 20 and two cantilevered arms 26. Connector housing 16 is insertable between cantilevered arms 26 which have projections 28 for engaging catches 30 on the exterior of connector housings 16. Assembly of the conventional SC adapter 10 involves inserting ferrule sleeve 20 within two retaining sleeves 24 of the two inner halves 22 and bonding the two inner halves 22 together inside two outer halves 32 that are also bonded together during assembly. The two outer halves 32 are sized to receive the ends of conventional SC connectors 12 including the ends of grip sleeves 18. The outer halves 32 are also commonly provided with flanges to allow mounting of the coupler to frames and the like.

As can be seen from the standard configuration of FIGS. 1 and 2, moisture can reach the mated end faces of connectors 12 through split ceramic sleeve 20.

With reference to FIGS. 3–7, the preferred embodiment of adapter 50 of the present invention is shown. Adapter 50 generally comprises alignment sleeve 52 received in sealing sleeve halves 54, 56 which are retained in retainer 58.

Alignment sleeve 52 is preferably of a split ceramic sleeve configuration as is known in the art. Alignment sleeve 52 has first end 64 and second end 66 opposite thereto and inside surface 68 defining longitudinal passageway 70 therethrough. Alignment sleeve 52 also defines longitudinal slit (see sleeve 20 in FIG. 1) which gives sleeve 52 a generally c-shaped cross-section to allow for radial expansion of alignment sleeve 52. Inside surface 68 of alignment sleeve 52 is configured to receive and operatively align the first ends of two ferrules 14 as is known.

Figure 4:
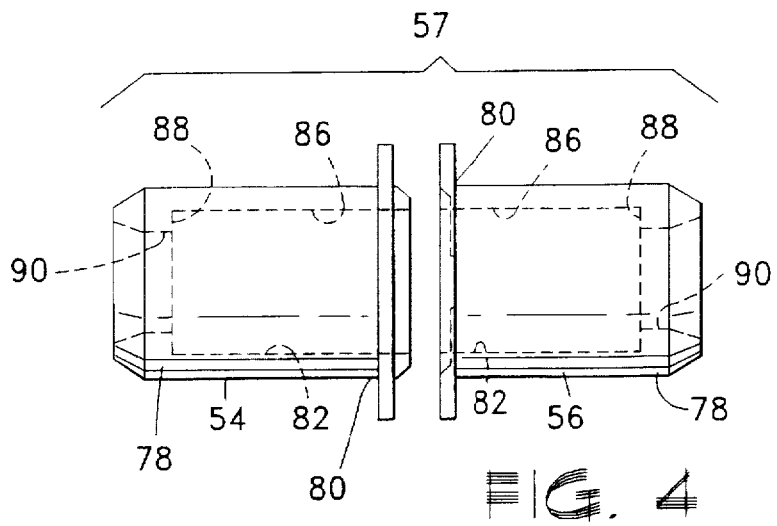
FIG. 4 is a side view of the first and second seal sleeve halves of the preferred embodiment of the adapter of the present invention.
Figure 5:
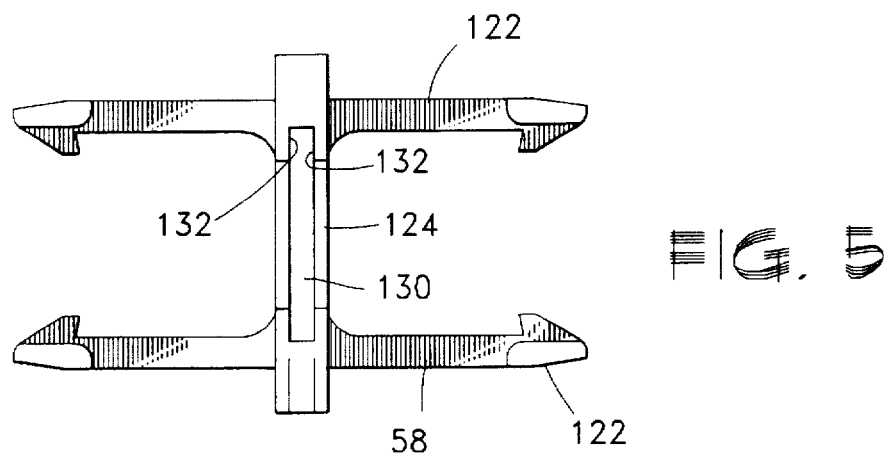
FIG. 5 is a side view of the retainer of the preferred embodiment of the adapter of the present invention.
Figure 6:
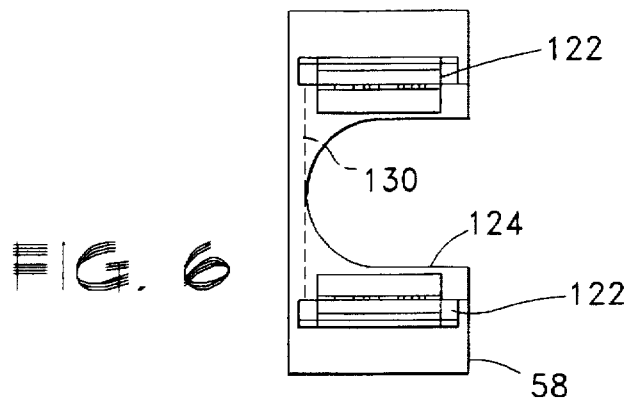
FIG. 6 is an end view of the retainer of the preferred embodiment of the adapter of the present invention.

First sealing sleeve half 54 and second sealing sleeve half 56 sealingly mate together to form sealing sleeve 57 over alignment sleeve 52. Sealing sleeve halves 54, 56 are preferably identical except for the seal interface between them. With reference to FIG. 4, each half has first end 78 and second end 80 opposite thereto, and each half has inside surface 82 that defines longitudinal passageway 84 therethrough. Passageway 84 has cavity 86 extending inward from second end 80. Cavity 86 terminates at shoulder 88. When seal sleeve halves 54, 56 are mated over alignment sleeve 52, the two cavities 86 receive alignment sleeve 52 therein with each end of the alignment sleeve disposed proximal a shoulder 88.

Passageway 84 also has sealing passage 90 between shoulder 88 and first end 78 of each sealing sleeve half. In the preferred embodiment, inside surface 82 has cylindrical seal surface 92 that defines sealing passage 90. Seal surface 92 is sized to circumferentially seal around a ferrule upon insertion of the ferrule into seal sleeve half 54 or 56 to prevent passage of moisture into cavity 86.

Second end 80 of each seal sleeve half has flange 94 extending radially therefrom. Flange 94 has first side 96 for sealingly mating with another first side 96 of another flange 94. Flange 94 also has second side 98 opposite first side 96 and periphery 100.

First side 96 of flange 94 of first sealing sleeve half 54 defines raised rib 102 encircling passageway 84. First side of flange 94 of second sealing sleeve half 54 defines annulus 104 that corresponds to rib 102 and is sized to receive rib 102 sealingly therein. Thus, rib 102 and annulus 104 cooperate to provide a face seal 106 between first and second sealing sleeve halves 54, 56 to prevent passage of moisture into cavity 86 when the two halves are mated.

When two ferrules are operatively inserted into sealing sleeve halves 54, 56 and alignment sleeve 52, the end faces of the ferrules are protected from moisture by the circumferential seals on each ferrule by seal surfaces 92 and face seal 106 between the two sealing sleeve halves. Sealing sleeve halves 54, 56 are preferably made from a thermoplastic elastomer, for example Kraton available from GLS. This has been found to be sufficiently resilient to allow a sealing interference fit of seal surfaces 90 to ferrules and a compressible face seal 106 between sealing sleeve halves.

The subassembly 110 of sealing sleeve halves 54, 56 and alignment sleeve 52 is captured in retainer 58. Retainer 58 has center flange portion 120 with latch arms 122 extending therefrom. Latch arms 122 are sized and located relative to each other just as is known in the standard assembled SC arrangement as shown in U.S. Pat. No. 5,359,688 to Underwood. Center flange portion 120 is oriented generally perpendicular to the longitudinal direction and defines a generally unshaped slot 124 that opens to one side of flange portion 120 to receive subassembly 110 therein for subassembly 110 to extend through center flange portion 120. Slot 124 has inside surface 126, and center flange portion further defines channel 130 in inside surface 126 of slot 124 so as to define opposing channel walls 132. Channel walls 132 are preferably spaced apart to receive mated flanges 94 of sealing sleeve halves 54, 56 therein in an interference fit so that channel walls 132 bias flanges 94 against each other to maintain face seal 106 therebetween. Retainer 58 is preferably made of a harder material than sealing sleeve halves 54, 56, such as an engineering thermoplastic, for example, Ultem available from GE Polymers.

After subassembly 110 is inserted into retainer 58, then conventional outer halves may be installed over retainer 58 as is known with conventional SC adapters. For example, outer halves are ultrasonically welded together over retainer 58. By using outer halves of the conventional size and configuration and by having latch arms 122 sized and located relative to each other as in an assembled conventional SC adapter, the present invention can be used with conventional SC connectors.

Assembly of adapter 50 is accomplished simply by placing sealing sleeve halves 54, 56 over alignment sleeve 52 to create subassembly 110 and then sliding mated flanges 94 of sealing sleeve halves 54, 56 into channel 130 of retainer 58 until subassembly 110 is located through center flange portion 120. Outer halves may then be installed over retainer 58.

In operation, two connectors are inserted into adapter 50 as is conventional with SC connectors and adapters. As each connector is inserted, the end face of the ferrule passes through sealing passage 90 and into alignment sleeve 52 where it remains disposed for abutting against another end face of another ferrule. When the connectors are connected to adapter 50, seal surfaces 92 are circumferentially sealed about a portion of a respective ferrule to prevent ingress of moisture to cavity 86 where the end faces of the ferrules are located.

Connectors may be repeatedly removed and connected to adapter 50 without appreciably effecting the sealing of adapter 50 due to the positive retention of sealing sleeve halves 54, 56 in channel 130 of retainer 58. It should be understood that while the drawings depict the SC connector and adapter context, the present invention may also be adapted for other standard connector styles, for example, FC, ST compatible and MTP connectors.

Although the present invention has been described with respect to a preferred embodiment, various changes, substitutions and modifications may be suggested to one skilled in the art and its is intended that the present invention encompass such changes, substitutions and modifications as fall within the scope of the following claims.

We claim:

1. An adapter for receiving optical fiber connectors in mating relationship, the connectors each having a ferrule having a first end with an end face for abutting with an end face of another connector, a second end opposite thereto defining a longitudinal axis extending from the first end to the second end, and an outside surface, the adapter comprising:

(a) two seal sleeve halves joined together to create a sealing sleeve that defines a passageway therethrough, each seal sleeve half defining a seal surface sized to circumferentially seal around a ferrule when the ferrule is inserted into the adapter, each seal sleeve half defining a flange with a first surface for sealingly mating with the first surface of the other flange (b) an alignment sleeve sized located generally co-axially within the two seal sleeve halves and longitudinally between the seal surfaces, the alignment sleeve sized for receiving and operatively aligning the end faces of two connectors therein, the ferrule sleeve having a first end and a second end opposite thereto; and (c) a retainer for retaining the flanges of the two seal sleeve halves biased together in a face seal relationship.

2. The adapter of claim 1 wherein the retainer defines a channel sized to receive the flanges of the two seal sleeve halves in an interference fit therein.

3. The adapter of claim 1 further comprising a sealant applied between the flanges of the two seal sleeve halves.

4. The adapter of claim 1 wherein the first surface of one of the flanges defines a raised circular rib encircling the passageway and the first surface of the other flange defines an annulus sized to receive the raised circular rib therein.

5. The adapter of claim 1 wherein the retainer is adapted for having connectors mounted thereto.

6. The adapter of claim 1 wherein the retainer has flange portion oriented generally perpendicular to the longitudinal direction of the sealing sleeve and defines a slot that allows for insertion of the sealing sleeve into the flange portion in a lateral direction.

7. An adapter for sealingly receiving ferrules of optical fiber connectors, comprising:

(a) a sealing sleeve having a first end and a second end opposite thereto and defining a passageway therethrough, the first end and the second end each defining a seal surface sized for sealingly receiving a ferrule therethrough such that when a ferrule is inserted into each of the first and second ends, moisture is prevented from reaching the end faces of the ferrules;

(b) an alignment sleeve disposed in the passageway of the sealing sleeve between the seal surfaces of the first end and second end, respectively, the alignment sleeve sized for operatively aligning the end faces of the ferrules in an abutting relationship; and (c) a retainer for retaining the seal sleeve and for mounting of connectors thereto.

8. The adapter of claim 7 wherein the seal sleeve is comprised of two seal sleeve halves that are removably face sealed together.

* * * * *